(12) United States Patent
Shen et al.

(10) Patent No.: US 7,627,051 B2
(45) Date of Patent: Dec. 1, 2009

(54) METHOD OF MAXIMIZING MIMO SYSTEM PERFORMANCE BY JOINT OPTIMIZATION OF DIVERSITY AND SPATIAL MULTIPLEXING

(75) Inventors: Jun Shen, Palo Alto, CA (US); Chiu Y. Ngo, San Francisco, CA (US); Huaning Niu, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1046 days.

(21) Appl. No.: 10/984,248

(22) Filed: Nov. 8, 2004

(65) Prior Publication Data

US 2006/0098760 A1  May 11, 2006

(51) Int. Cl.
*H04B 7/02* (2006.01)
(52) U.S. Cl. .................. 375/267; 375/295; 375/299; 375/316; 455/101
(58) Field of Classification Search ............. 375/259, 375/299, 267, 295
See application file for complete search history.

(56) References Cited

U.S. PATENT DOCUMENTS

| | | |
|---|---|---|
| 6,501,810 B1 | 12/2002 | Karim et al. |
| 7,039,131 B2 | 5/2006 | Banerjea |
| 7,061,854 B2 | 6/2006 | Tarokh et al. |
| 7,394,754 B2 | 7/2008 | Li et al. |

| | | | |
|---|---|---|---|
| 2003/0185310 A1 * | 10/2003 | Ketchum et al. | ............ 375/259 |
| 2005/0186986 A1 | 8/2005 | Hansen et al. | |
| 2006/0056281 A1 | 3/2006 | Ngo | |

OTHER PUBLICATIONS

G. Foschini, *Layered Space-Time Architecture for Wireless Communication in a Fading Environment When Using Multi-Element Antennas*, Bell Labs Tech. J., 1996,pp. 41-59, vol. 1, No. 2.

D. Gesbert, L. Haumonte, H. Bolcskei, R. Krishnamoorthy, A. Paulraj, *Technologies and performance for non-line-of-sight broadband wireless access networks*, IEEE Communications Magazine, Apr. 2002, pp. 86-95.

L. Zheng and D. Tse, *Diversity and multiplexing: a fundamental tradeoff in multiple-antenna channels*, IEEE Trans. Info. Theory, May 2003, pp. 1073-1096, vol. 49.

F. R. Farrokhi, G. J. Foschini, A. Lozano, and R. A. Valenzuela, *Link-optimal space-time processing with multiple transmit and receive antennas*, IEEE Comm. Letters, Mar. 2001, No. 3, pp. 85-87, vol. 5.

(Continued)

*Primary Examiner*—Simon Sing
*Assistant Examiner*—Simon King
(74) *Attorney, Agent, or Firm*—Kenneth L. Sherman, Esq.; Michael Zarrabian, Esq.; Myers Andras Sherman LLP

(57) ABSTRACT

A method of transmission in a wireless communication system having a transmitter and a receiver. In the transmitter: signals are encoded using a space-domain precoder for spatial multiplexing, time-domain variable delay is introduced at each signal communication path for time diversity, and the signal are transmitted to the receiver. In the receiver the signal transmissions from the transmitter are decoded using a space-domain decoder, wherein time diversity and spatial multiplexing are combined, to increase communication robustness and spectral efficiency.

16 Claims, 6 Drawing Sheets

OTHER PUBLICATIONS

H. Sampath, P. Stoica, and A. Paulraj, *Generalized linear procoder and decoder design for MIMO channels using the weighted MMSE criterion*, IEEE Trans. Comm., Dec. 2001, pp. 2198-2206, vol. 49, No. 12.

A. Scaglione, P. Stoica, S. Barbarossa, G. B. Giannakis, and H. Sampath, *Optimal designs for space-time linear precoders and decoders*, IEEE Trans. Signal Processing, May 2002, pp. 1051-1064, vol. 50, No. 5.

U.S. Office Action for U.S. Appl. No. 10/938,254 mailed Aug. 12, 2008.

U.S. Office Action for U.S. Appl. No. 10/938,254 mailed Feb. 2, 2009.

* cited by examiner

FIG. 5 - Typical eigen-mode power distribution of 4x4 IEEE802.11n channel model E with 0.5λ antenna spacing

METHOD OF MAXIMIZING MIMO SYSTEM PERFORMANCE BY JOINT OPTIMIZATION OF DIVERSITY AND SPATIAL MULTIPLEXING

FIELD OF THE INVENTION

The present invention relates generally to data communication, and more specifically to data communication in multiple data streams/paths to be transmitted via multiple transmission channels of a multi-channel communication system such as a multiple-input multiple-output (MIMO) system.

BACKGROUND OF THE INVENTION

In wireless communication systems that use radio frequency (RF) transmissions, an RF signal from a transmitter may reach a receiver via a number of propagation paths or channels. To provide diversity against harmful path effects and improve performance, multiple transmit and receive antennas are used. Propagation paths between the transmit and receive antennas are independent when a transmission on one path is not formed as a linear combination of the transmissions on the other paths.

A multiple-input-multiple-output (MIMO) communication system employs multiple transmit antennas and multiple receive antennas for data transmission. A MIMO channel formed by the transmit and receive antennas may be decomposed into independent channels, wherein each channel is a spatial subchannel (or a transmission channel) of the MIMO channel and corresponds to a dimension. The MIMO system can provide improved performance (e.g., increased transmission capacity) if the additional dimensionalities created by the multiple transmit and receive antennas are utilized.

In spatial multiplexing, there are different data streams/paths in the same channel wherein a different transmission antenna is used for each data stream. In MIMO systems, in order to realize advantages of spatial multiplexing for high spectral efficiency, the wireless channels need to be multipath-rich and less correlated.

To increase spectral efficiency in MIMO systems, some conventional approaches use a transmitter that employs a spatial multiplexing scheme to send signals to the receiver. This includes finding a pair of linear transformations at transmitter precoder and receiver decoder in the space-domain such that maximum spectral efficiency is reached. However, although throughput (spectral efficiency) is increased, communication link robustness may be reduced. Examples of such conventional approaches for linear transmitter precoder and receiver decoder optimization in the space-domain which only increase spectral efficiency without increasing system link robustness are discussed in one or more of the following five papers, incorporated herein by reference: (1) G. Foschini, "Layered space-time architecture for wireless communication in a fading environment when using multi-element antennas," Bell Labs Tech. J., vol. 1, no. 2, 1996, (2) L. Zheng and D. Tse, "Diversity and multiplexing: a fundamental tradeoff in multiple-antenna channels," IEEE Trans. Info. Theory, vol. 49, May 2003, (3) F. R. Farrokhi, G. J. Foschini, A. Lozano, and R. A. Valenzuela, "Link-optimal space-time processing with multiple transmit and receive antennas," IEEE Comm. Letters, vol. 5, March 2001, (4) H. Sampath, P. Stoica, and A. Paulraj, "Generalized linear procoder and decoder design for MIMO channels using the weighted MMSE criterion," IEEE Trans. Comm., vol. 49, December 2001, and (5) A. Scaglione, P. Stoica, S. Barbarossa, G. B. Giannakis, and H. Sampath, "Optimal design for space-time linear precoders and decoders," IEEE Trans. Signal Processing, vol. 50, May 2002.

Other conventional approaches have incorporated space-time diversity to increase communication link robustness by incorporating time-domain delays at each transmit communication path. However, although communication link robustness is increased, throughput performance is decreased. Examples of such conventional approaches which include switching between time diversity and spatial multiplexing to accommodate link robustness and spectral efficiency, without joint optimization, are discussed in one or more of the following two papers, incorporated herein by reference: (1) D. Gesbert, L. Haumonte, H. Bolcskei, R. Krishnamoorthy, A. Paulraj, "Technologies and performance for non-line-of-sight broadband wireless access networks," IEEE Communications Magazine, April 2002, and (2) L. Zheng and D. Tse, "Diversity and multiplexing: a fundamental tradeoff in multiple-antenna channels," IEEE Trans. Info. Theory, vol. 49, May 2003.

There is, therefore, a need for a method and system that jointly increases the MIMO system performance by introducing time-domain variable delay at each path in the transmitter along with space-domain precoder and decoder optimization.

BRIEF SUMMARY OF THE INVENTION

The present invention addresses the above needs. In one embodiment, the present invention provides a method of transmission in a wireless communication system having a transmitter and a receiver. In the transmitter: signals are encoded using a space-domain precoder spatial multiplexing, time-domain variable delay is introduced at each signal communication path for time diversity using a variable delay device, and the signal are transmitted to the receiver. In the receiver the signal transmissions from the transmitter are decoded using a space-domain decoder, wherein time diversity and spatial multiplexing are combined, to increase communication robustness and spectral efficiency.

The precoder and decoder comprise a pair of linear matrices whose entries are jointly optimized along with variable time delay for each communication path. As such, the variable delay device, the precoder and the decoder are configured such that time diversity gain and spectral efficiency gain (via spatial multiplexing) are essentially jointly optimized. In one example, the wireless communication system comprises a multiple-input multiple-output (MIMO) system, such that the transmissions from the transmitter form multipaths.

As such, a method and system according to the present invention increases MIMO system performance by joint optimization of diversity and spatial multiplexing. These and other features, aspects and advantages of the present invention will become understood with reference to the following description, appended claims and accompanying figures.

DETAILED DESCRIPTION OF THE INVENTION

Figure 1:
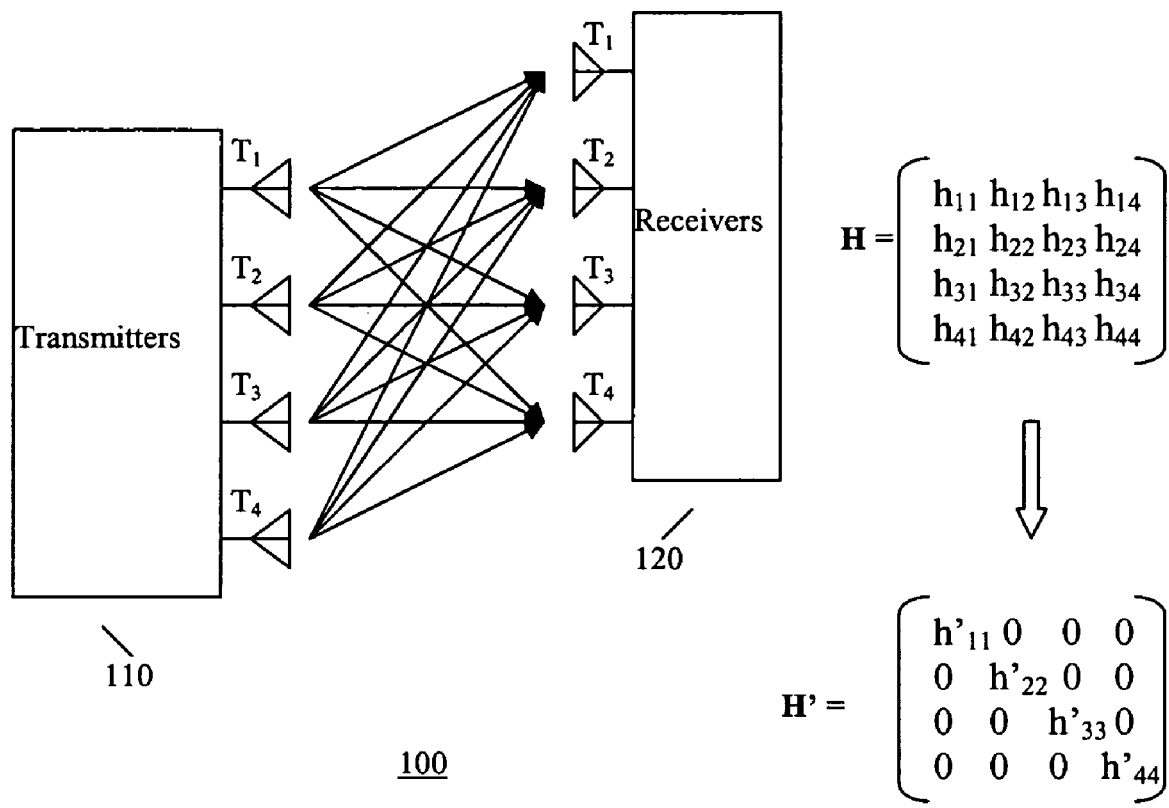
FIG. 1 shows a block diagram of an example MIMO system according to an embodiment of the present invention.

In one embodiment, the present invention provides a system and method that increases MIMO system performance by joint optimization of diversity and spatial multiplexing. Referring to FIG. 1, an example MIMO system 100 according to the present invention includes transmitters 110 and receivers 120 each having antennas ($T_1 \ldots T_4$), wherein the channel model is represented by a matrix H (FIG. 1) at a receiver. When a training packet is sent from the MIMO system 100, a receiver 120 extracts the channel profiles and estimates the channel matrix H. Based on the channel matrix, the receiver can determine the precoder/decoder matrix, and the corresponding eigenmode power distribution. The receiver 120 then feeds back either the channel matrix H or the eigenmode power profile and the precoder matrix back to the transmitter 110. The transmitter 110 adaptively adjusts the delay to increase the diversity order of the combined streams. The transmitter 110 and the receiver 120 communicate regularly among themselves (using feedback) to update the precoder/decoder matrices along with the delay.

If a strong/compatible signal is received, the matrix H is resolved, and the channel matrix is transformed into a diagonal matrix H' by diagonalization/inversion, representing a virtual multi-channel such that the gain is increased. When channel inversion is performed, based on channel characteristics and decoding of the received signals, if the multiple channels are relatively independent, then there are multiple separated paths for the received signals, thus increasing throughput.

Figure 2:
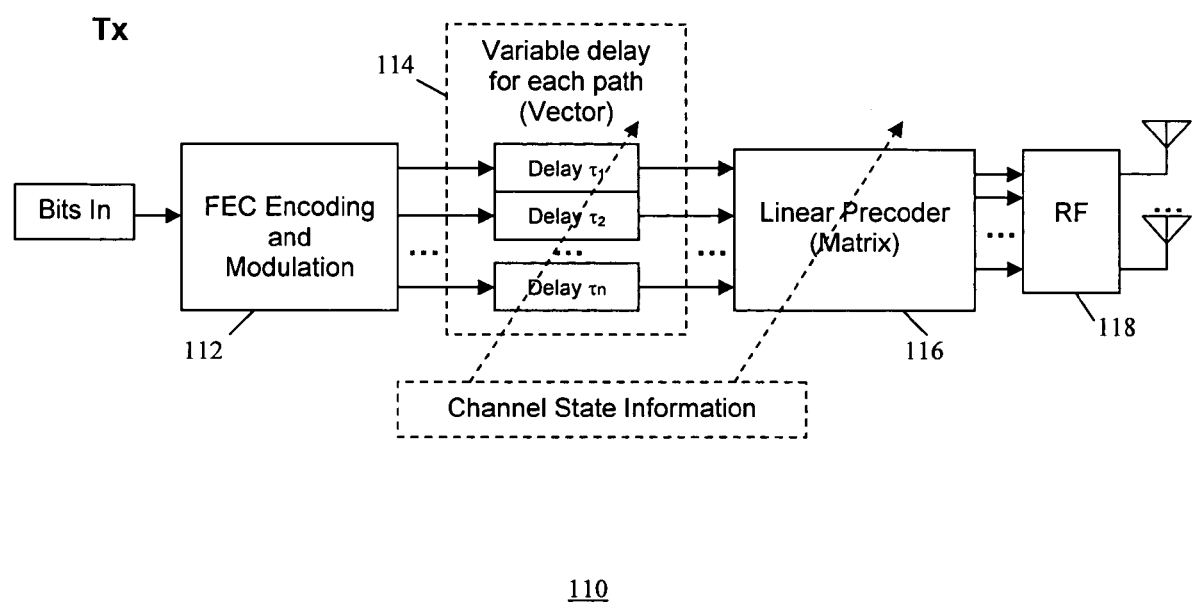
FIG. 2 shows a block diagram of an example architecture of a MIMO transmitter according to an embodiment of the present invention.
Figure 3:
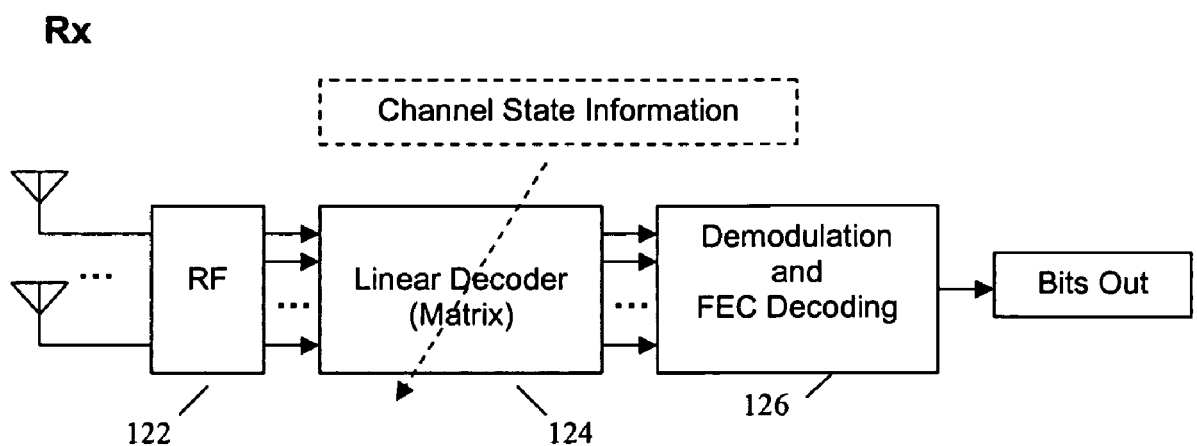
FIG. 3 shows a block diagram of an example architecture of a MIMO receiver according to an embodiment of the present invention.

An example transmitter 110 (Tx) is shown in FIG. 2, and example receiver 120 (Rx) is shown in FIG. 3, wherein performance is maximized by introducing time-domain variable delay at each path in the transmitter 110 along with the space-domain precoder and decoder transformation optimization. This is a non-linear scheme that combines both the diversity and multiplexing functions that can be jointly optimized for system link robustness and spectral efficiency.

Figure 4:
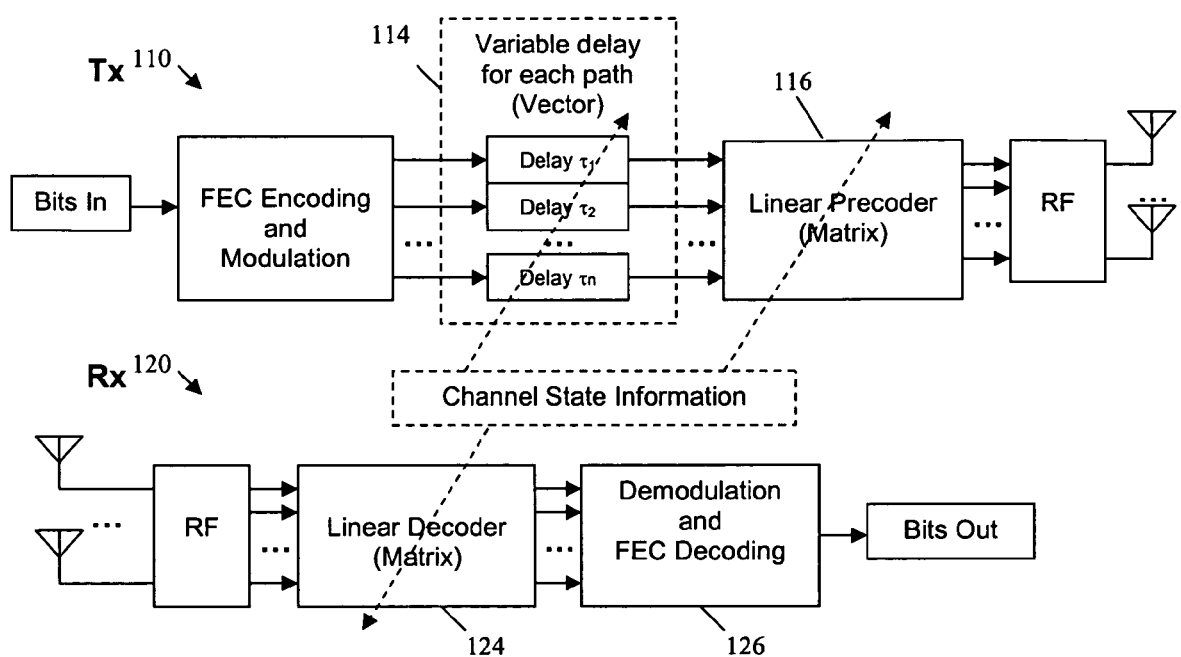
FIG. 4 shows a block diagram of an example architecture of a MIMO wireless communication system including the transmitter of FIG. 2 and the receiver of FIG. 3.

The transmitter 110 includes an encoding and modulation block 112, a variable delay block 114, a linear precoder 116, and an RF block 118. The receiver 120 includes an RF block 122, a linear decoder block 124 and a demodulation and decoding block 126. The example MIMO system 200 in FIG. 4 comprises the transmitter 110 of FIG. 2, and the receiver 120 of FIG. 3. In the example MIMO system 200 (FIG. 4), adaptive variable delays are introduced at the transmitter 110 Tx along with the linear precoder and decoder in the system 200, assuming that the Channel State Information (CSI) is known. The transmitter 110 Tx includes the linear precoder matrix 116 and the receiver 120 Rx includes the linear decoder matrix 124.

Conventional MIMO systems attempted to adjust a precoder matrix entries and a decoder matrix entries such that the combined received channel profile is relatively independent, whereby the received signal from different channel paths can be distinguished such that the precoder and decoder can maximize throughput. This pair of transformations in the precoder and decoder provides spatial multiplexing, and though throughput of the channel goes up, reliability is not improved. Also, variable delay has been introduced for each path in the transmitter to create time diversity. This provides antenna diversity, where robustness of the link goes up but the throughput is not improved.

However, according to an embodiment of the present invention, both channel throughput and channel reliability are improved by combining spatial multiplexing and time diversity. An essentially optimal pair of transformations are combined with time diversity. In the system 200 of FIG. 4, the Channel State Information (CSI) is obtained from channel measurement and feedback to the transmitter. Based on the CSI, the path delay and/or precoder-decoder matrix entries are adjusted, such that the combined effect achieves the goal of increasing channel throughput and reliability. This is an adaptive way of adjusting the channel characteristics to increase throughput and reliability.

According to an embodiment of the present invention, joint optimization of matrix entries of the precoder 116 and the decoder 124, and variable time delay for each path in the MIMO system 200 is performed to achieve increased throughput and channel reliability. The constraints and parameters for joint optimization include: Signal to Noise Ratio (SNR), throughput, error rate, etc.

The MIMO system 200 combines diversity (through adjusting delays time $\tau_1, \tau_2, \tau_3, \ldots, \tau_n$, for n communication paths, respectively, via the variable delay block 114) with spatial multiplexing (via linear precoder 116 and decoder 124). Consider the system model Y=GHFX+GN, where H is the channel matrix, G represents the decoder 124, F represents the precoder 116, X represents a set of transmitted coded symbols, Y represents the received signals, and N is the noise vector. G and F can be solved using singular value decomposition (SVD), which diagonalizes the H matrix so as to separate data streams. General eigen-beamforming requires changing the coding and modulation on sub-carrier basis, which provides the so-called water-filling solution. However, complexity may be high from implementation point of view. Therefore, the coding and modulation scheme can be modified for all data streams across all subcarriers to reduce system complexity across all subcarriers.

Figure 5:
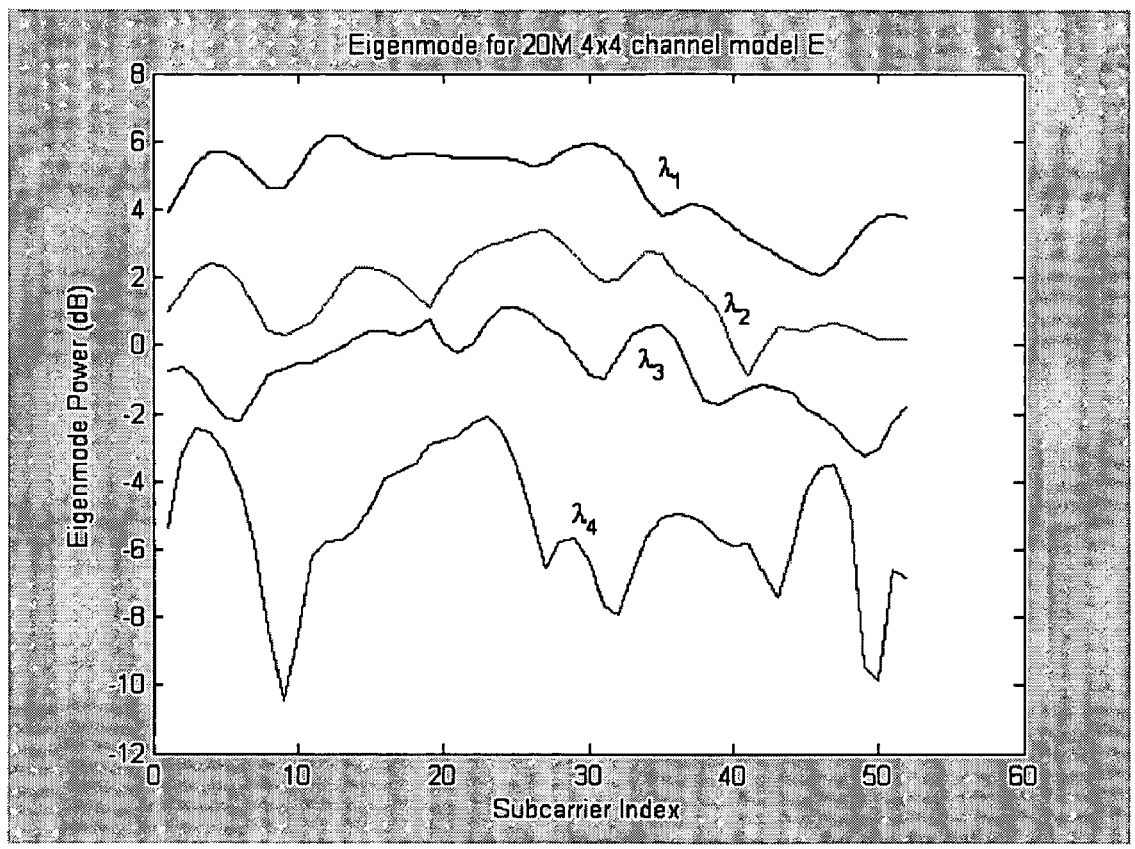
FIG. 5 shows a snap shot of eigen-mode power distribution for a typical 4×4 IEEE802.11n channel model E with 0.5λ antenna spacing.
Figure 6:
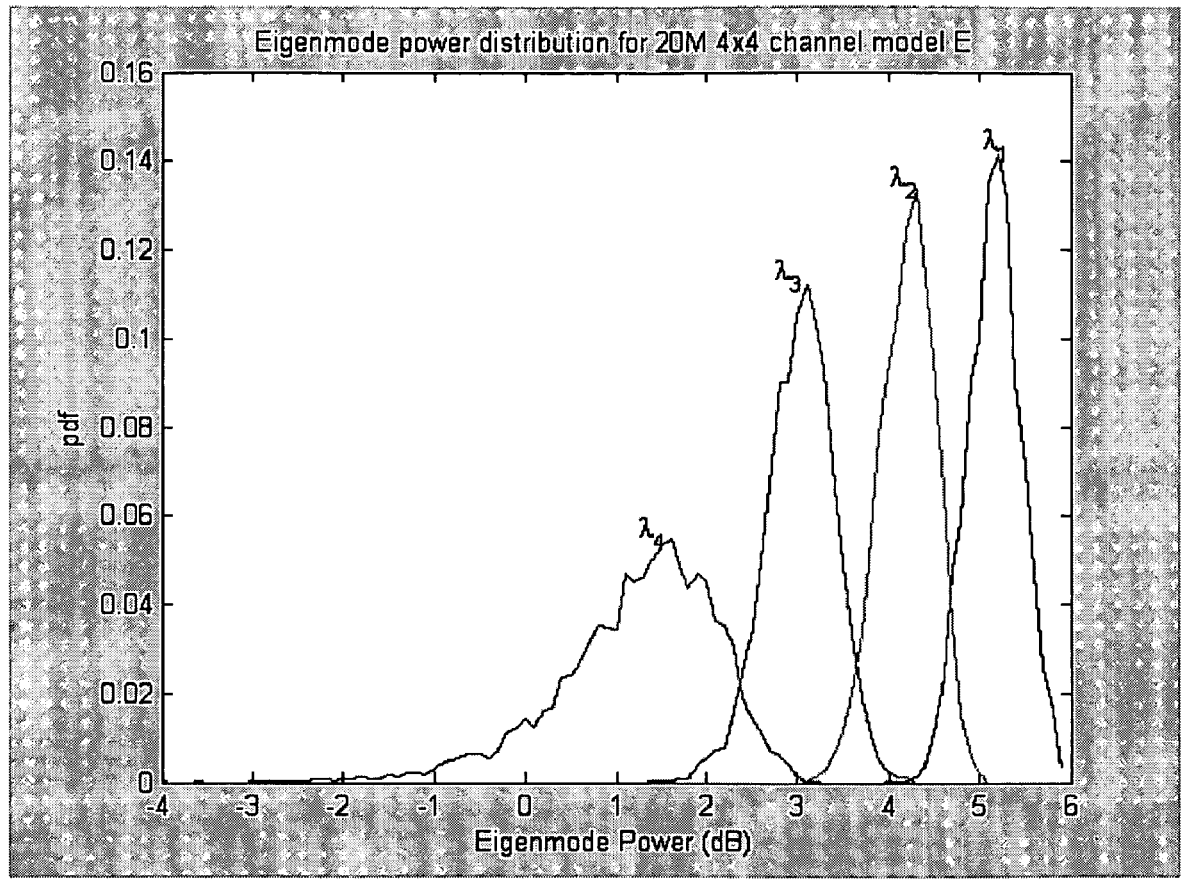
FIG. 6 shows the probability density function (pdf) of the eigenvalue distribution by averaging over 1000 channel realizations.

After diagonalization, the multiplexing gain and the diversity gain are jointly optimized. The underlying principle can be explained by observing the distribution of the eigenvalues of the H matrix. FIG. 5 shows an example the power level of four eigen-modes (1, 2, 3, 4) corresponding to eigenvalues $\lambda_1$, $\lambda_2$, $\lambda_3$ and $\lambda_4$, respectively ($\lambda_1 \geq \lambda_2 \geq \lambda_3 \geq \lambda_4$). Further, FIG. 6 shows the pdf of the eigenvalue distribution averaging over 1000 channel realizations.

For high eigenvalues, power is concentrated (see FIG. 6) and the spectrum is flat (see FIG. 5) and therefore multiplexing gain can be achieved with these modes. However, for the eigenmode with low power, severe frequency selectivity exists, where fading often occurs at the same subcarriers. In this case, eigenmodes 3 and 4 are provided more protection by using diversity.

The packet error rate (PER) is dominated by the worst data streaming over the smallest eigenmode channel, therefore the joint optimization problem can be formulated using the maximization of the post-combing minimum SNR criterion. The joint optimization is a non-linear process, wherein a two-step optimization algorithm is utilized. First, the eigenmode is allocated to different data streams based on the sum of the eigenvalues across all the sub-carriers. Second, diversity schemes are designed for the combined eigenmodes to maximize the post-combining SNR. It is assumed that the MIMO system has $N_t$ transmitter antennas, $N_r$ receiver antennas, and m multiplexing streams to be transmitted, where $m \leq \min(N_t, N_r)$.

Accordingly:

Step 1—Initialization: Compute the SVD of the channel matrix H, and sort the eigenvalues from highest to lowest.

Step 2—Allocate eigenmodes to data streams: Based on the sum of the eigenvalues of all subcarriers for each eigenmode, allocate the eigenmodes to different data streams as evenly as possible, using an iterative process.

Step 3—Diversity schemes: Design diversity schemes across the selected eigenmodes to maximize the post-combining SNR of the data streams. This design depends on the instantaneous eigenmode power distribution.

The above scheme assumes that there is no power loading across data streams. However, as those skilled in the art will recognize, it is straightforward to extend the power-loading schemes after Step 3, also based on the maximization of minimum post-combining SNR criterion.

In an example joint optimization process, adaptive adjustments are made to the delay vector $(\tau_1, \tau_2, \tau_3, \ldots, \tau_n)$ in the variable delay block 114 and matrices in the linear precoder 116 and the linear decoder 124, such that the system throughput (spectral efficiency) and link robustness (diversity) are maximized. For example, the variably delay block 114 can randomly introduce time delay, or use selective means of introducing variable time delays.

As such, MIMO performance is improved, and preferably maximized, by introducing the time-domain variable delay at each path in the transmitter Tx 110 on top of the space-domain precoder 116 and decoder 124. This is a non-linear scheme that combines both the diversity and multiplexing functions that is jointly optimized for system link robustness and spectral efficiency, as described. One of the potential applications of the invention is in the MIMO high-speed wireless home networking system including networked consumer electronics and computers. Other applications are also possible which include netmeeting/video conferencing in enterprise networks, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A wireless communication system comprising:
   a transmitter including:
      a space-domain precoder configured for processing in the space-domain, and
      a variable delay device configured for introducing adaptive time-domain variable time delay at each signal communication path for time diversity in the time-domain, where the variable delay device introduces delay in each path to modify the signal characteristics such that the signal along different paths are received with higher diversity order at the receiver;
   a receiver including a space-domain decoder for processing in the space-domain, wherein the receiver receiving signal transmissions from the transmitter, the receiver sends channel state information (CSI) back to the transmitter including eigenmode power distribution and precoder matrix, and the variable delay device adaptively adjusts the variable delays based on the CSI feedback from the receiver to provide uncorrelated signal transmissions at the receiver;
   such that the transmitter and the receiver combine time diversity and spatial multiplexing, to increase communication robustness and spectral efficiency, wherein the received signal transmissions are based on the output of the decoder, a channel matrix, precoder output, set of coded symbols and a noise vector, where the system is based on the model of Y=GHFX+GN, where Y is the received signal transmissions, G is the output of the decoder, H is the channel matrix, F is the precoder output, X is the set of coded symbols and N is the noise vector.

2. The system of claim 1, wherein the precoder and the decoder comprise a pair of linear matrices such that their entries are transformation optimized.

3. The system of claim 1, wherein the precoder and the decoder comprise a pair of linear matrices such that their entries are transformation optimized along with variable time delay for each communication path.

4. The system of claim 3 wherein: the variable delay device, the precoder and the decoder are configured such that time diversity gain and spectral efficiency gain via spatial multiplexing are essentially jointly optimized.

5. The system of claim 4, wherein the wireless communication system comprises a multiple-input multiple-output (MIMO) system, such that the transmissions from the transmitter form multipaths.

6. The system of claim 1, wherein the adaptive time-domain variable delay at each signal communication path is introduced randomly.

7. The system of claim 1, wherein the adaptive time-domain variable delay at each signal communication path is introduced selectively.

8. A method of transmission in a wireless communication system including a transmitter and a receiver, comprising:
   in the transmitter:
      precoding signals using a space-domain precoder for spatial multiplexing in the space-domain;
      adaptively adjusting a delay vector in a variable delay block using spatial multiplexing;
      introducing time-domain adaptive variable delay at each signal communication path for time diversity in the time-domain such that signals along different paths are received with higher diversity order at the receiver; and
      transmitting the signals to the receiver; and
   in the receiver:
      receiving signal transmissions from the transmitter;
      sending channel state information (CSI) back to the transmitter including eigenmode power distribution and precoder matrix; and
      decoding the signal transmissions from the transmitter using a space-domain decoder in the space-domain;
   wherein matrices in the precoder and the decoder are adaptively adjusted, wherein spectral efficiency and link robustness are maximized, the introduced variable delay adaptively adjusts the variable delays based on the CSI feedback from the receiver to provide uncorrelated signal transmissions at the receiver, and
   wherein time diversity and spatial multiplexing are combined, to increase communication robustness and spectral efficiency.

9. The method of claim 8, wherein the precoder and the decoder comprise a pair of linear matrices such that their entries are transformation optimized.

10. The method of claim 9, wherein the precoder and decoder comprise a pair of linear matrices such that their entries are transformation optimized along with variable time delay for each communication path.

11. The method of claim 8 further comprising essentially jointly optimizing time diversity gain and spectral efficiency gain via spatial multiplexing to achieve increased throughput and channel reliability.

12. The method of claim 11, wherein the wireless communication system comprises a multiple-input multiple-output (MIMO) system, such that the transmissions from the transmitter form multipaths.

13. The method of claim 12, wherein joint optimization further includes:
   computing singular value decomposition of a channel matrix H to obtain multiple data streams;
   allocating eigenmodes to the data streams; and
   providing diversity across the eigenmodes to maximize post-combination SNR of the data streams.

14. The method of claim 13, wherein allocating the eigenmodes further includes:
   determining the sum of the eigenvalues of all subcarriers for each eigenmode, and allocating the eigenmodes to different data streams as evenly as possible, using an iterative process.

15. The method of claim 14, wherein allocating the eigenmodes further includes the steps of:
   using diversity to protect small eigenvalues.

16. The method of claim 8, wherein eigenmodes are allocated to different data streams based on a sum of eigenvalues across all sub-carriers and diversity is allocated for all combined eignemodes based on instantaneous eigenmode power distribution to maximize post-combining SNR of the data streams.

* * * * *